(12) United States Patent
Ramanathan et al.

(10) Patent No.: US 11,099,824 B2
(45) Date of Patent: *Aug. 24, 2021

(54) POLICY-DRIVEN MANAGEMENT OF APPLICATION TRAFFIC FOR PROVIDING SERVICES TO CLOUD-BASED APPLICATIONS

(71) Applicant: A10 Networks, Inc., San Jose, CA (US)

(72) Inventors: Ragavan Ramanathan, San Jose, CA (US); Alak Deb, San Jose, CA (US); Sudarshan Raghavan, Bangalore (IN); Anirudha Kamatgi, Bangalore (IN); Sridhar Srinivasan, Bangalore (IN); Girish Karthik Ramasamy, Bangalore (IN); Srinath Chandrashekhar, Bangalore (IN); Akshay Mathur, Bangalore (IN)

(73) Assignee: A10 Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/294,351

(22) Filed: Mar. 6, 2019

(65) Prior Publication Data

US 2019/0205117 A1 Jul. 4, 2019

Related U.S. Application Data

(63) Continuation of application No. 14/940,129, filed on Nov. 12, 2015, now Pat. No. 10,268,467.

(Continued)

(51) Int. Cl.
*G06F 8/65* (2018.01)
*H04L 29/08* (2006.01)
*H04L 12/24* (2006.01)

(52) U.S. Cl.
CPC ............ *G06F 8/65* (2013.01); *H04L 41/0893* (2013.01); *H04L 67/1095* (2013.01);
(Continued)

(58) Field of Classification Search
CPC ... G06F 8/65; H04L 41/0893; H04L 67/1095; H04L 67/34; H04L 41/046;
(Continued)

(56) References Cited

U.S. PATENT DOCUMENTS 7,904,409 B2 * 3/2011 Prathaban ............. G06F 40/211
706/47
8,270,310 B2 * 9/2012 Raleigh ............... H04L 47/2408
370/252

(Continued)

OTHER PUBLICATIONS

Bhattacharya et al, "Dynamic Updates for Web and Cloud Applications", [Online], 2010, pp. 21-25, [Retrieved from internet on Mar. 9, 2021], <https://dl.acm.org/doi/pdf/10.1145/1810139.1810143> (Year: 2010).*

(Continued)

*Primary Examiner* — S. Sough
*Assistant Examiner* — Zengpu Wei
(74) *Attorney, Agent, or Firm* — Keith Kline; The Kline Law Firm PC (57) ABSTRACT

Provided are methods and systems for transition between a current cloud-based code environment and an updated cloud-based code environment. A method for transition between a current cloud-based code environment and an updated cloud-based code may commence with generating a steering policy. The steering policy may include a set of rules to guide steering decisions between a current cloud-based code environment and an updated cloud-based code environment. The method may further include sending the steering policy to a steering server. The steering server may make steering decisions to steer, based on the steering
(Continued)

policy, service requests between the current cloud-based code environment and the updated cloud-based code environment. The method may continue with receiving feedback concerning actual steering decisions made by the steering server. The method may further include automatically adjusting the steering policy in response to the feedback.

16 Claims, 7 Drawing Sheets

Related U.S. Application Data (60) Provisional application No. 62/078,400, filed on Nov. 11, 2014.

(52) U.S. Cl.
CPC ............ *H04L 67/34* (2013.01); *H04L 41/046* (2013.01); *H04L 41/082* (2013.01); *H04L 41/0816* (2013.01); *H04L 41/5025* (2013.01); *H04L 41/5067* (2013.01)

(58) Field of Classification Search
CPC ............... H04L 41/0816; H04L 41/082; H04L 41/5025; H04L 41/5067
USPC ........................................................ 717/170
See application file for complete search history.

(56) References Cited

U.S. PATENT DOCUMENTS

| | | | | |
|---|---|---|---|---|
| 8,880,689 | B2* | 11/2014 | Yamanaka | H04L 41/5067 709/224 |
| 9,158,577 | B2* | 10/2015 | Lipscomb | G06F 9/485 |
| 9,225,621 | B2* | 12/2015 | Tseitlin | H04L 41/5025 |
| 9,356,910 | B2 | 5/2016 | Chen et al. | |
| 9,380,646 | B2* | 6/2016 | Cui | H04W 92/02 |
| 10,102,302 | B2* | 10/2018 | Kapoor | G06F 16/958 |
| 2004/0253956 | A1 | 12/2004 | Collins | |
| 2009/0037361 | A1* | 2/2009 | Prathaban | G06Q 30/02 706/47 |
| 2010/0188975 | A1* | 7/2010 | Raleigh | G06Q 40/00 370/230.1 |
| 2013/0166731 | A1* | 6/2013 | Yamanaka | H04L 41/5067 709/224 |
| 2014/0047115 | A1* | 2/2014 | Lipscomb | G06F 9/485 709/226 |
| 2014/0052838 | A1* | 2/2014 | Giacomoni | H04L 41/0893 709/223 |
| 2014/0372897 | A1* | 12/2014 | Kapoor | G06Q 50/20 715/741 |
| 2014/0379901 | A1* | 12/2014 | Tseitlin | H04L 41/5096 709/224 |
| 2015/0085650 | A1* | 3/2015 | Cui | H04W 92/02 370/230 |
| 2015/0119149 | A1* | 4/2015 | Spitzer | A63F 13/85 463/43 |
| 2015/0128121 | A1* | 5/2015 | Garcia | G06F 8/65 717/170 |
| 2015/0381465 | A1* | 12/2015 | Narayanan | H04L 43/062 709/224 |
| 2016/0112497 | A1 | 4/2016 | Koushik et al. | |

OTHER PUBLICATIONS

Huang et al, "On the Cloud-based Network Traffic Classification and Applications Identification Service", [Online], 2012, pp. 36-41, [Retrieved from internet on Mar. 9, 2021], <https://ieeexplore.ieee.org/stamp/stamp.jsp?tp=&arnumber=6271287> (Year: 2012).*

Iqbal et al, "SLA-Driven Adaptive Resource Management for Web Applications on a Heterogeneous Compute Cloud", [Online], 2009, pp. 243-253, [Retrieved from internet on Mar. 9, 2021], <Iqbal et al is cited for teaching SLA-Driven Adaptive Resource Management for Web Applications on a Heterogeneous Comp> (Year: 2009).*

* cited by examiner

POLICY-DRIVEN MANAGEMENT OF APPLICATION TRAFFIC FOR PROVIDING SERVICES TO CLOUD-BASED APPLICATIONS

CROSS-REFERENCE TO RELATED APPLICATIONS

The present application is a continuation of, and claims the priority benefit of U.S. patent application Ser. No. 14/940,129 filed on Nov. 12, 2015, entitled "POLICY-DRIVEN MANAGEMENT OF APPLICATION TRAFFIC FOR PROVIDING SERVICES TO CLOUD-BASED APPLICATIONS," the disclosure of which is incorporated herein by reference in its entirety for all purposes.

FIELD OF THE INVENTION

The invention relates generally to computer networking, and more specifically, to policy-driven steering/management of network traffic to replicated deployments, which may differ in some specific feature such as software version numbers, to cloud-based applications or remotely executed applications for providing application services such as automated version updates, feature evaluation etc.

BACKGROUND

Remote applications are accessed by users of an end device through a network. The application can be executed remotely, or be downloaded for local execution (e.g., using Java or Citrix). During upgrades of codets in remote applications using a continuous deployment model, it is common to have a production environment with a current version of the application code (e.g., a blue environment), and a separate production environment with an updated version of the application code (e.g., a green environment). The typical process is to fully deploy a well-tested new version of code but if problems ensue the code is rolled back to a previous version. A more prudent approach is to divert a small or non-critical production traffic from the default blue environment to the green environment in order to update and verify the new codet. A small percentage of traffic can be sent to the green environment and, based on the updated results, and more or less of production traffic can be sent in a sequence of phases. Once the codet is verified to satisfaction, all application traffic can be steered to the green environment and the blue environment can be retired.

Current approaches for traffic steering or splitting between blue and green environments are performed manipulating DNS end points of an application. This approach is done by configuring the application server IP addresses for both blue and green environment in the DNS entry, and then controlling the number of application server entries to steer/split the traffic proportionally between the two environments.

While this approach will split between the environments, it is very difficult to control the percentage of traffic that is split, or to split the traffic based on some application related conditions, or based on some user or user device conditions. Typically, conditions are based on some attributes of the application traffic. When the application traffic uses HTTP or HTTPS (SSL) as the transport, the HTTP header values can be used for the conditions. However, today, there is no service or product that is readily available to conditionally split traffic based on HTTP header values between completely different application environments.

Furthermore, it is difficult to ascertain performance or functional correctness of a split for verification. After tedious configuration changes to split or steer traffic between different application environments, understanding the effect of the application changes by comparing various performance and functional metrics involves manually reviewing multiple metrics dashboards and log files.

What is needed is a robust technique to improve traffic steering to a second environment. Further, improved feedback of performance and functionality at different splits is desired.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for transition between a current cloud-based code environment and an updated cloud-based code environment. According to one approach of the present disclosure, there is provided a system for transition between a current cloud-based code environment and an updated cloud-based code environment. The system may include an analytics server and a steering server. The analytics server may be configured to generate a steering policy. The steering policy may include a set of rules to guide steering decisions between a current cloud-based code environment and an updated cloud-based code environment. The analytics server may be further configured to send the steering policy to a steering server and receive feedback concerning actual steering decisions made by the steering server. The analytics server may automatically adjust the steering policy in response to the feedback. The steering server may be configured to make steering decisions to steer, based on the steering policy, service requests between the current cloud-based code environment and the updated cloud-based code environment. Generally, traffic steering or management refers to dropping, mirror, redirecting, splitting and rate limiting between replicated application deployments of traffic based on rules. Traffic rules can split traffic based on a logical expression of domain, path and headers of an HTTP request, for example. Other embodiments also steer based on smartflows, which further group traffic flows directed to a specific compute resources that may require specific services to be applied on them, such as specific policies to be differentially applied to these traffic flows for the purpose of securing them, collecting metrics and statistics measuring effectiveness of alternative implementations, etc. Code environments tend to be replica of each other differing in some key attributes such as software version, alternative implementation of features, or between a production and staging or test deployment.

According to another approach of the present disclosure, a method for transition between a current cloud-based code environment and an updated cloud-based code environment is provided. The method may commence with generating a steering policy. The steering policy may include a set of rules to guide steering decisions between a current cloud-based code environment and an updated cloud-based code environment. The method may further include sending the steering policy to a steering server. The steering server may make steering decisions to steer, based on the steering policy, service requests between the current cloud-based code environment and the updated cloud-based code environment. The method may continue with receiving feedback concerning actual steering decisions made by the steering server. The method may further include automatically adjusting the steering policy in response to the feedback.

Advantageously, deployments of new versions of remotely executing software are improved, among other improvements.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

In the following disclosure, methods, computer program products, and systems for policy-driven management of application traffic for providing services to cloud-based applications are described. Generally, users are steered to either a current version of applications to an updated version of those applications, during a period or deployment.

Systems for Policy-Driven Application Traffic Management (FIGS. 1 to 5)

Figure 1:
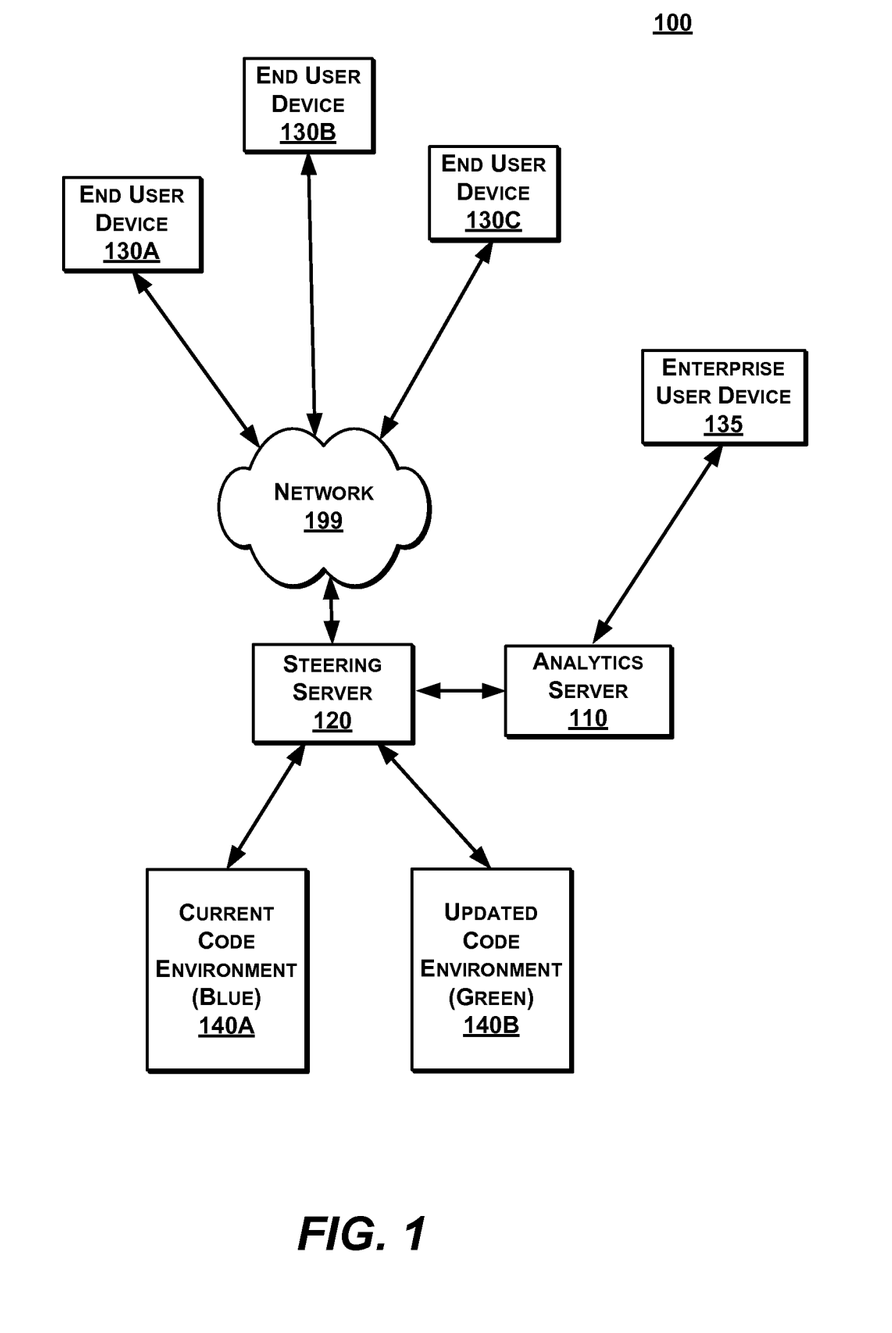
FIG. 1 is a high-level block diagram illustrating a system for policy-driven management of application traffic for providing services to cloud-based applications, according to an embodiment.

FIG. 1 is a high-level block diagram illustrating a system 100 for policy-driven management of application traffic for providing services to cloud-based applications, according to an embodiment. The system 100 comprises an analytics server 110 and a steering server 120 connected through a network 199 to end user devices 130A-C and current code environment (blue) 140A and updated code environment (green) 140B. Generally, the analytics server 110 employs the steering server 120 to gradually steer traffic from the current environment 140A to the updated environment 140B, while gathering analytics for automatic adjustments and reporting to an enterprise user device 135 (e.g., development operator or a network administrator). Policy-driven application traffic management can be provided as a service for green deployments by clients. For example, an Amazon or Google data center hosting client web sites can provide improved transitions to from blue to green environments.

The network architecture of the system 100 includes the analytics server 110 coupled to the steering server 120 either directly, as showing, or indirectly through the network 199, as in other embodiments. Similarly, the blue and green environments 140A,B can be located within a LAN along with the steering server 120, as shown, or indirectly through the network 199, in other embodiments. The end user devices 130A-C and the enterprise user device 135 can access components through the network 199, via wired or wireless connections. The enterprise user device 135 can also be a network administrator that connects directly to the analytics server or the steering server 120 to make command line adjustments through a wired or wireless connection. Generally, connections can be wired (e.g., Ethernet, serial port, power lines, analog telephone lines), wireless (Wi-Fi, 3G/4G, Bluetooth), or a combination of both. Other network architectures are possible with additional network components such as access points, routers, Wi-Fi or SDN (software defined networking) controllers, firewalls, gateways, and the like.

The analytics server 110 provides control and feedback to a user of the system 100 during deployment of updated code for cloud-based applications. The analytics server 110 can include a user interface for access through the Internet, USB connection, mobile app, or the like. A configuration engine, in some instances, saves creates a user profile in order to like the analytics server 110 to a particular cloud-based application with log-in credentials, IP addresses, end point or destination LAN information, or the like, and also information for creating a policy for traffic steering between the current and updated environments 140A,B. The policy can describe a profile of desired traffic to be sent to either environment and be based on a variety of parameters, such as end user device type, time of day, wireless or mobile requests, type of application, user history, application conditions or traffic conditions, just to illustrate a few examples. The analytics server 110 outputs configuration information to the steering server 120 in order to implement policies.

The analytics server 110 receives feedback from the steering server 120 and highlights specific metrics based on policies. For example, a performance score and/or a functional score that summarizes the success of the updated environment 140B at the current traffic split. In another example, very detailed metrics about different types of user devices 130A-C, application response times, amount of errors, processor usage, bandwidth usage, memory usage, or the like are provided, in the form of a matrix.

Responsive to real-time performance metrics, in one embodiment, the analytics engine 110 can automatically adjust the steering policies. If a current stage of deployment is successful, the analytic server 110 can more fully activate the updated environment 140B. Some embodiments automatically adjust ratios based on preconfigured thresholds of performance.

The analytics server 110 can comprise a server blade, a personal computer (PC), a virtualized cloud-based service device, or any other appropriate processor-based device. In some embodiments, the analytics server 110 is operated by a service provider, such as a data center providing virtual hosting services for the cloud-based applications. In other embodiments, the analytics server 110 is self-implemented by an application developer that purchases and owns a software product.

More detailed examples of the steering server 120 are described below with respect to FIG. 4.

The steering server 120 implements policies of the analytics server 110 to selectively steer network traffic for a cloud-based application between the current and the updated code environments 140A,B. In more liberal implementations, a mere ratio of traffic splitting is provided by policies, leaving a large amount of selection discretion to the steering server 120. In more granular implementations, a strict demographic of traffic diversity provides more direction to the steering server 120. In one instance, a certain percentage of mobile traffic or guest log-ins is sent to the updated code environment 140B. Other instances, percentages are based on real-time application conditions, performance, or error rates. Even if actual incoming traffic loads deviate from predicted or desired traffic loads, the steering server 120 has the capability of discriminating actual traffic loads to produce desired traffic loads on either environment.

In one embodiment, the steering server 120 automatically implements steering policy adjustments. The policy adjustments can be immediately implemented, or current sessions can be completed and subsequent sessions are adjusted. In some situations, existing user devices continue with earlier steering policies while new user devices are treated under updated steering policies.

The steering server 120 can comprise any of the devices described in relation to the analytics server 110. In one embodiment, the steering server 120 is physically integrated with the analytics engine and operated by a common entity (e.g., commonly operated by a data center, or commonly manufactured by a vendor). In another embodiment, the steering server 120 is manufactured by a first vendor and hosted by a first entity, and the analytics server 110 is manufactured by a second vendor and is hosted by a second entity.

Generally, the steering policy can guide steering decisions between the current and updated code environments. Traffic steering or management refers to dropping, mirror, redirecting, splitting and rate limiting between replicated application deployments of traffic based on rules. Traffic rules can split traffic based on a logical expression of domain, path and headers of an HTTP request, for example. Other embodiments also steer based on smartflows, which further group traffic flows directed to a specific compute resources that may require specific services to be applied on them, such as specific policies to be differentially applied to these traffic flows for the purpose of securing them, collecting metrics and statistics measuring effectiveness of alternative implementations, etc.

More detailed examples of the steering server 120 are described below with respect to FIG. 3.

The user devices 130A-C and the current and updated environments 140A,B can comprise any of the processor-based devices described herein. The user devices 130A-C can have human or machine users that access cloud-based applications, for example, through a smart phone, laptop, tablet, phablet or personal computer, or java or web interface. Execution can occur completely in the cloud, completely on the user devices 130A-C, or in cooperation. In some cases, a user device 130A-C is profiled by the system 100 in order to meet traffic diversity requirements of a policy. The environments 140A,B can comprise, for example, a subset of a data center, an individual server, or a virtualized group of network locations, for example. The current and updated types of environments are mere illustrations as any type of first and second environments can be implemented for various purposes in continuous deployment (e.g., legacy and testing environments).

More detailed examples of the steering server 120 are described below with respect to FIG. 5.

The current and updated code environments 140A,B can store and execute cloud-based applications. Code environments tend to be replica of each other differing in some key attributes such as software version, alternative implementation of features, or between a production and staging or test deployment. In one case, only one application provided by a single entity resides on an environment. In another case, many different applications provided by many different entities resides on an environment. The current and updated code environments 140A,B can be physically located on different servers or virtual servers, or alternatively, be located on a single device.

Figure 2:
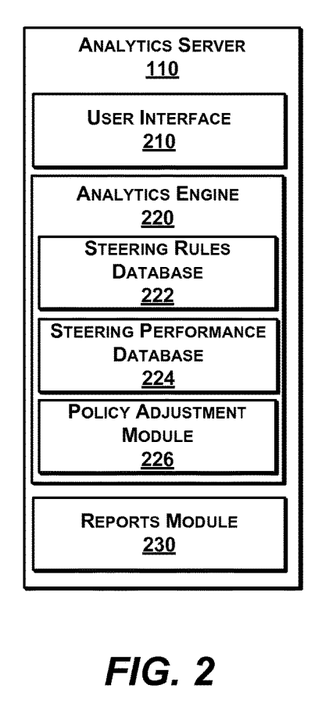
FIG. 2 is a more detailed block diagram illustrating an analytics server of the system in FIG. 1, according to an embodiment.

FIG. 2 is a more detailed block diagram illustrating the analytics server 110 of the system in FIG. 1, according to an embodiment. The analytics server 110 comprises a user interface 210, an analytics engine 220, and reports module 230.

The user interface 210 allows the enterprise user device 135 access to the analytics server 110 for configuring deployments and for making deployment adjustments. User accounts are established to secure and customize implementations. Preferences can be entered by checkboxes or responsive to a script of questions presented to an admin, and be converted to specific steering rules.

The analytics engine 220 automatically implements steering policies at the steering server 120. A steering rules database 222 stores steering rules for deployments and download to the steering server 120. The steering performance database 224 downloads performance metrics from the steering server 110 based on actual steering decisions. Further analytics can be performed, for example, by aggregating deployment metrics for several applications or several different clients. A policy adjustment module 226 can implement deployment adjustments responsive to analytics. In some embodiments, adjustments are automatically completed using customer steering rules or general business processes. In other embodiments, adjustments are manually entered by the enterprise user device 135.

The reports module 230 can present various views of analytic data on-demand to an enterprise server device 135. Additionally, reports can be periodically generated. Moreover, alarms can be raised based on a current deployment situation such as a server failure.

Figure 3:
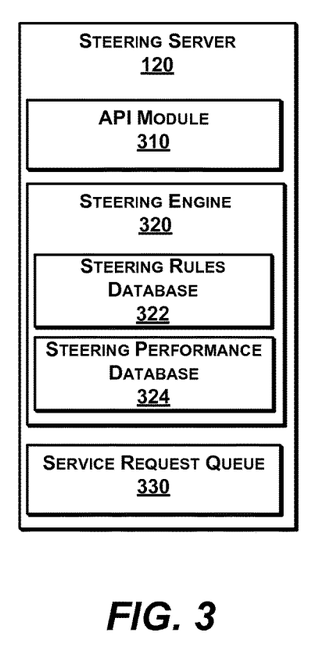
FIG. 3 is a more detailed block diagram illustrating a steering server of the system in FIG. 1, according to an embodiment.

FIG. 3 is a more detailed block diagram illustrating the steering server 120 of the system in FIG. 1, according to an embodiment. The steering server 120 includes an API (application programming interface) module 310, a steering engine 320, and a service request queue 330.

The API module 310 provides an I/O interface for the analytics server 110 and the end user device 130. The analytics server 110 sends commands and data the steering engine 320 to affect steering policy, and the steering server sends data back to the analytics server 110. Separately, service requests are received and stored into the service request queue 330.

In an embodiment, the steering engine 320 makes real-time decisions on whether to redirect requests for service to a blue or a green environment (or other related type of environment). A steering rules database 322 stores rules sent from the steering rules database 222. Metrics associated with environment performance are collected by a steering performance database 324.

The service request queue 330 stores service requests until redirected. There can be one queue or separate queues per client, per application, or per environment, for example.

Figure 4:
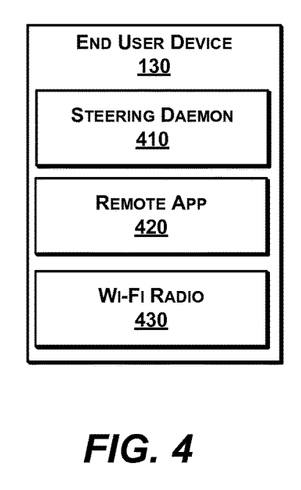
FIG. 4 is a more detailed block diagram illustrating an end user device of the system in FIG. 1, according to an embodiment.

FIG. 4 is a more detailed block diagram illustrating the end user device 130 (generically representing the end user devices 130A-C) of the system in FIG. 1, according to an embodiment. The end user device 130 comprises a steering daemon 410, a remote app 420 and a Wi-Fi radio 430.

The steering daemon 410 executes locally for communicating data back to the steering engine 320. General environmental characteristics can be sent, such as device type, operating system type and version, static and dynamic computing resources (e.g., memory and processor usage). Additional characteristics available concern execution feedback of the remote app 420b being routed to blue or green environments (e.g., service delays and application performance). The remote app 420 is a locally executed version of the service provided by blue or green environments.
The Wi-Fi radio 430 is just one example of a communication module based on the device and network connection type.

Figure 5:
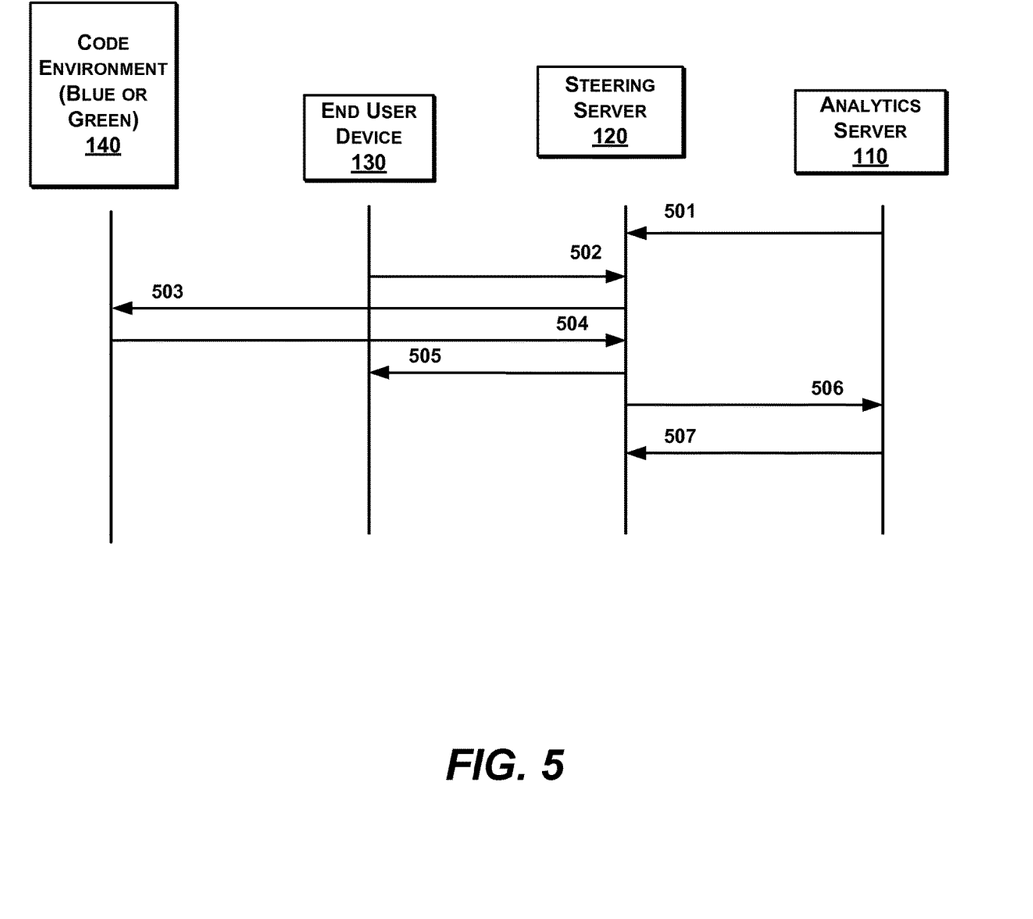
FIG. 5 is a sequence diagram illustrating interactions between components of FIG. 1, according to an embodiment.

FIG. 5 is a sequence diagram illustrating interactions 500 between components of FIG. 1, according to an embodiment.

Initially, the analytics server 110 sends policy steering rules to the steering server 120 to start a deployment (interaction 501). The end user device 502 sends a service request (interaction 502). The steering server 110 redirects service request to code environment 140, either blue or green (interaction 503), and awaits a response (interaction 504) for returning to the end user device 130 (interaction 505). Performance metrics are periodically sent from the steering server 120 back to the analytics server 110 (interaction 506). Based on analytics updated steering policies are sent (interaction 507).

Many variations are possible. The end user interactions 130 remain the same on the front end although environment selection on the back end can be handled differently at different times.

Figure 6:
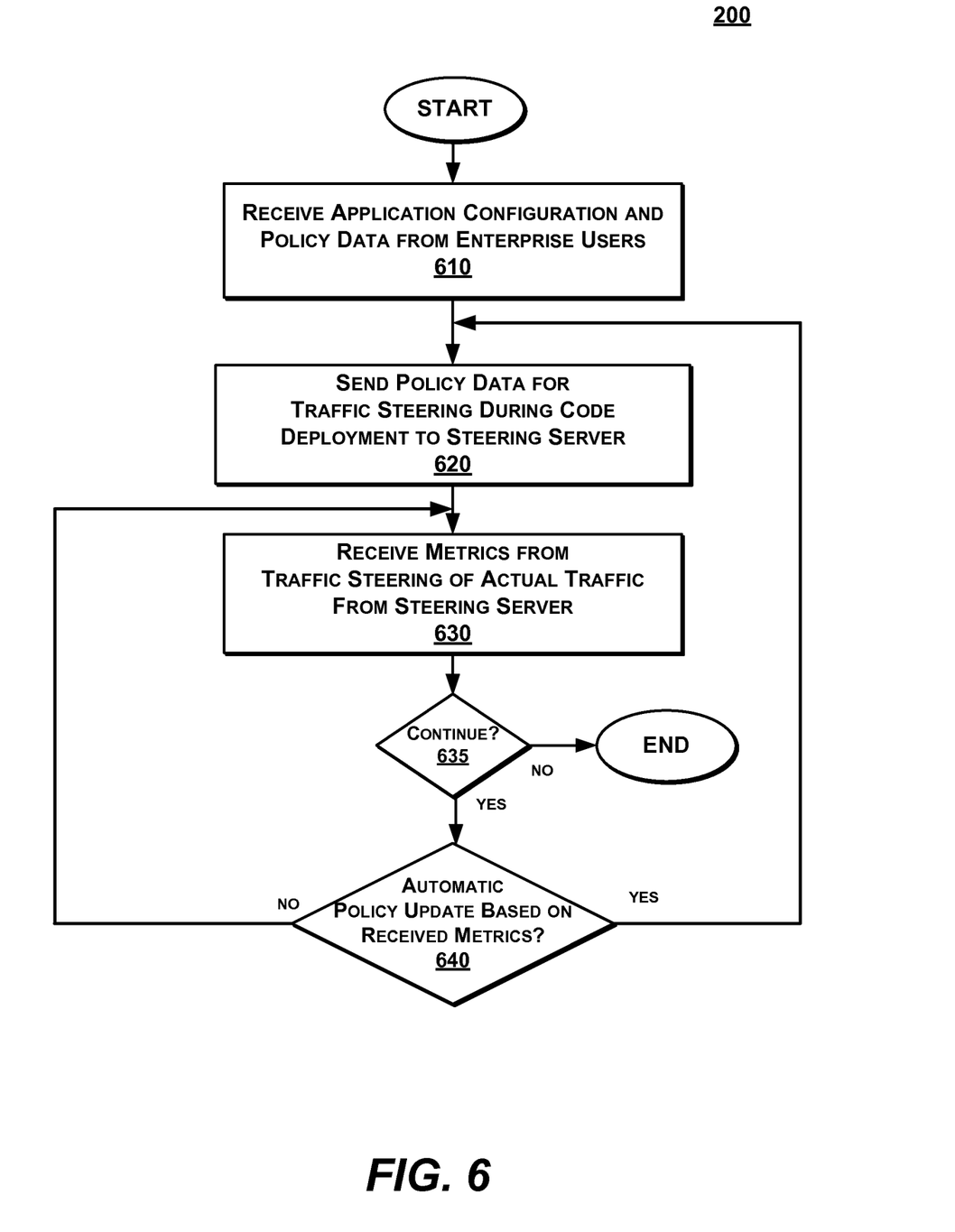
FIG. 6 is a high-level flow diagram illustrating a method for policy-driven management of application traffic for providing services to cloud-based applications, according to an embodiment.
Figure 7:
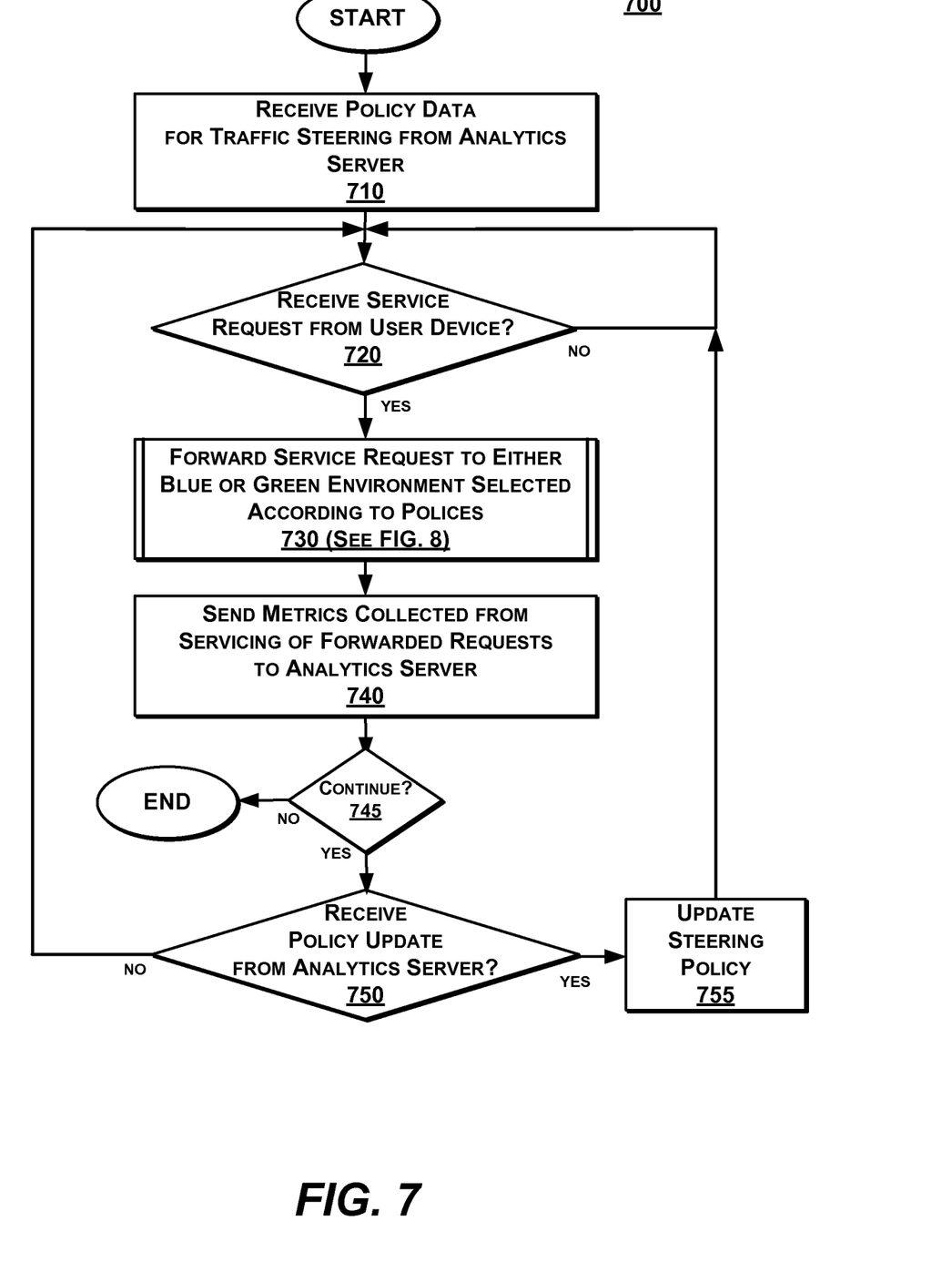
FIG. 7 is a high-level flow diagram illustrating a method for adjusting policy-driven management of traffic for providing services to cloud-based applications, according to one embodiment.
Figure 8:
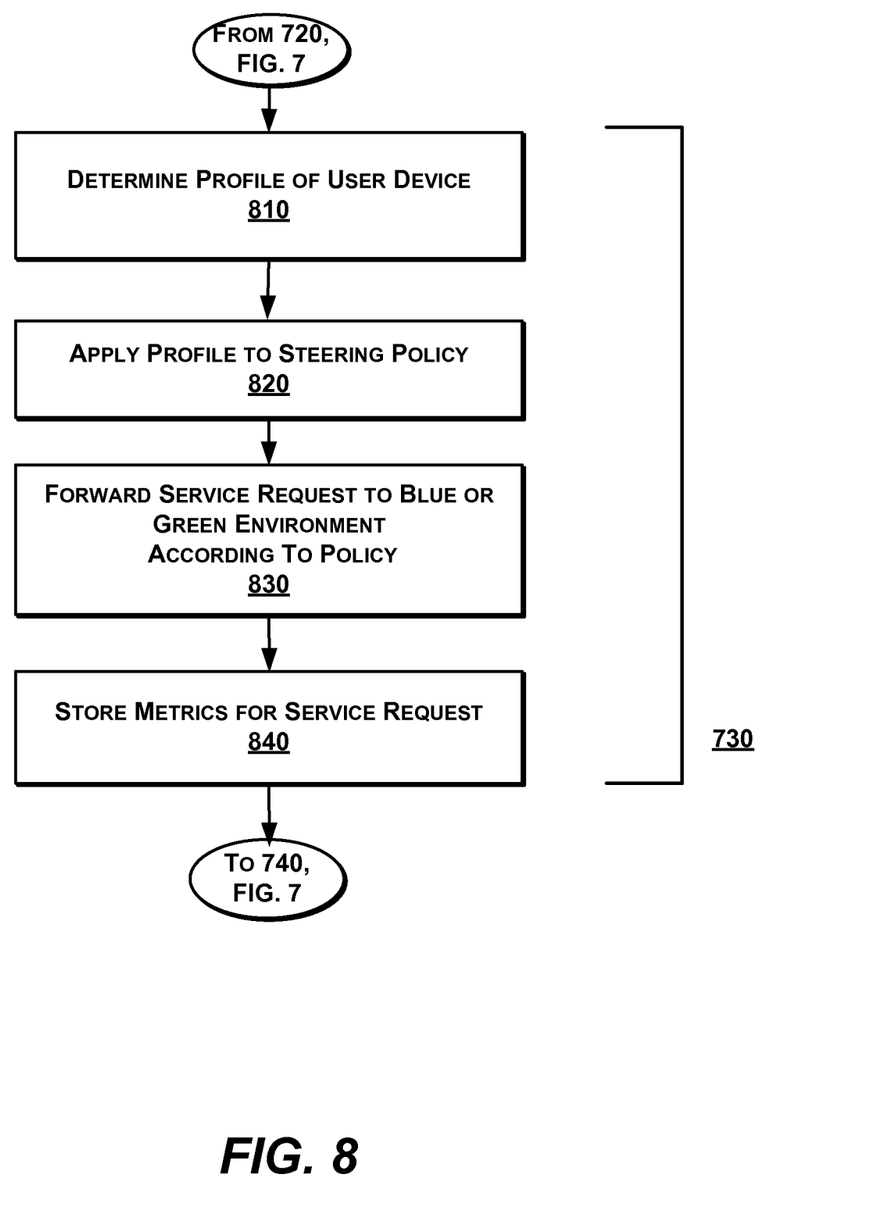
FIG. 8 is a more detailed flow diagram for a step of forwarding service request to either a blue or green environment selected according to steering policy, according to an embodiment.

Methods for Policy-Driven Application Traffic Management (FIGS. 6 to 8)

FIG. 6 is a high-level flow diagram illustrating a method 600 for policy-driven management of application traffic for providing services to cloud-based applications, according to an embodiment. The method 600 can be performed by an analytics component (e.g., the analytics server 110). Many different embodiments of the following methods are possible, such as more or fewer steps, steps occurring in different orders, and varied grouping of functionalities.

Application configuration and policy data is received from enterprise users (step 610). Policy data is sent to a steering server for traffic steering during code deployment (step 620). Metrics from traffic steering of actual traffic are received from the steering server (step 630). Based on the metrics, steering policies can be automatically updated at the steering server (steps 640, 641). Otherwise, metrics continue to be received even if no steering policies are adjusted (steps 640, 642).

FIG. 7 is a high-level flow diagram illustrating a method 700 for adjusting policy-driven management of traffic for providing services to cloud-based applications, according to one embodiment. The method 700 can be performed by a steering component (e.g., the steering server 120).

Policy data for traffic steering can be received from an analytics server (step 710). When service request are received from user devices (step 720), they are forwarded to either blue or green environments selected according to policies (step 730), as further described in FIG. 8. Metrics collected from servicing requests are sent to the analytics server (step 740). If, in response, a policy update is received from the analytics server (step 750), the steering policy is updated (step 755) before continuing to receive service requests. Otherwise, service requests continue to be handled under the existing policy.

FIG. 8 is a more detailed flow diagram for the step 730 of forwarding service request to either a blue or green environment selected according to steering policy, according to an embodiment.

A profile of a user device is determined by, for example, a daemon executing on a user device and communicating with a steering server (step 810). The profile is applies to a steering policy (step 820). As a result, service requests are forwarded to either blue or green environments according to the policy (step 830). Performance metrics for service requests are stored (step 840).

Figure 9:
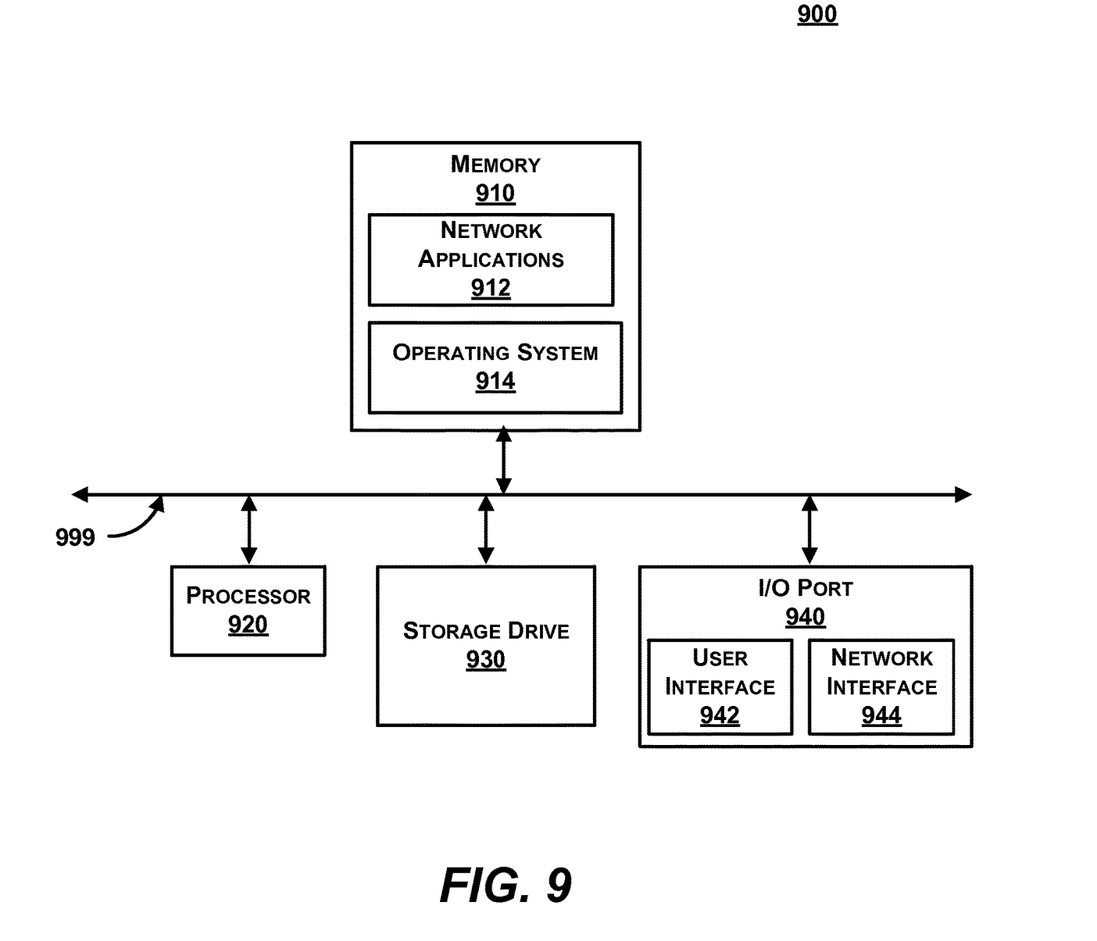
FIG. 9 is a block diagram illustrating an exemplary computing device, according to an embodiment.

General Computing Devices (FIG. 9)

FIG. 9 is a block diagram illustrating an exemplary computing device 900 for use in the system 100 of FIG. 1, according to one embodiment. The computing device 900 is an exemplary device that is implementable for each of the components of the system 100, including the analytics server 110, the steering server 120, the end user device 130, the enterprise user device 135 or the current or updated code environments 140A,B. The computing device 900 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 900, of the present embodiment, includes a memory 910, a processor 920, a storage drive 930, and an I/O port 940. Each of the components is coupled for electronic communication via a bus 999. Communication can be digital and/or analog, and use any suitable protocol.

The memory 910 further comprises network applications 912 and an operating system 914. The network applications 912 can include the modules of the analytics server 110, the steering server 120 and the end user device 130, as illustrated in FIGS. 2-4. Other network applications 912 can include a web browser, a mobile application, an application that uses networking, a remote application executing locally, a network protocol application, a network management application, a network routing application, or the like.

The operating system 914 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 9 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 920 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 920 can be single core, multiple core, or include more than one processing elements. The processor 920 can be disposed on silicon or any other suitable material. The processor 920 can receive and execute instructions and data stored in the memory 910 or the storage drive 930.

The storage drive 930 can be any non-volatile type of storage such as a magnetic disc, EEPROM, Flash, or the like. The storage drive 930 stores code and data for applications.

The I/O port 940 further comprises a user interface 942 and a network interface 944. The user interface 942 can output to a display device and receive input from, for example, a keyboard. The network interface 944 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11 g, 802.11 i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including FITML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

What is claimed is:

1. A non-transitory computer-readable storage medium having embodied thereon instructions, which, when executed by at least one processor, perform steps of a method, the method comprising:
generating, by an analytics server, a steering policy, the steering policy comprising a set of rules to guide steering decisions between a current cloud-based code environment and an updated cloud-based code environment, wherein the current cloud-based code environment implements a current version of a remotely hosted application and the updated cloud-based code environment implements an updated version of the remotely hosted application, wherein the steering policy comprises:
 a percentage of service requests to send to the current cloud-based code environment and a percentage of the service requests to send to the updated cloud-based code environment;
 a type of device to send to the current cloud-based code environment and a type of device to send to the updated cloud-based code environment; and
 a characteristic of a user of an end user device to forward a service request to a current end user device code environment and a second characteristic of a user of an end user device to forward a second service request to an updated end user device code environment;
sending, by the analytics server, the steering policy to a steering server;
receiving, by the analytics server, feedback concerning actual steering decisions made by the steering server, the feedback including at least an application delay time experienced by one or more end user devices when the updated cloud-based code environment processes the service requests associated with the one or more end user devices, the application delay time being determined based on metrics reported by the one or more end user devices to the steering server, wherein the metrics include dynamic computing resources associated with the one or more end user devices and a profile of the one or more end user devices, the profile storing configuration information associated with the one or more end user devices; and
automatically adjusting, by the analytics server, the steering policy in response to the feedback to provide an updated steering policy; and
making, by the steering server, steering decisions to steer, based on the steering policy, service requests between the current cloud-based code environment and the updated cloud-based code environment, wherein the steering decisions made by the steering server include:
selecting a ratio of splitting the service requests between the current cloud-based code environment and the updated cloud-based code environment; and
selecting types of the service requests to be steered to the updated cloud-based code environment;
wherein the steering server makes the steering decisions with regard to the service requests associated with one or more current network sessions based on the steering policy;
wherein the steering server makes the steering decisions with regard to the service requests associated with one or more subsequent network sessions based on the updated steering policy; and
wherein the steering policy includes one or more of the following: dropping application deployments of a traffic, mirroring the application deployments of the traffic, redirecting the application deployments of the traffic, splitting the application deployments of the traffic, and rate limiting between replicated the application deployments of the traffic.

2. The non-transitory computer-readable storage medium of claim 1, wherein the feedback concerning actual steering decisions made by the steering server comprises one or more of the following: performance metrics, duration of time between the service requests and responses to the service requests, and application delay time experienced by an end user device, as reported by a daemon executing on the end user device to the steering server.

3. The non-transitory computer-readable storage medium of claim 2, wherein the performance metrics include metrics associated with an operation of the updated cloud-based code environment and metrics communicated by a plurality of end user devices to the steering server.

4. The non-transitory computer-readable storage medium of claim 1, wherein the automatically adjusting the steering policy further comprises automatically adjusting the steering policy in response to input from a network administrator.

5. The non-transitory computer-readable storage medium of claim 1, wherein the automatically adjusting the steering policy comprises increasing the percentage of service requests to be sent to the updated cloud-based code environment based on the feedback.

6. The non-transitory computer-readable storage medium of claim 1, wherein the adjusting the steering policy comprises reducing the percentage of service requests to be sent to the updated cloud-based code environment based on the feedback.

7. The non-transitory computer-readable storage medium of claim 1, wherein the method further comprises:
receiving, by the analytics server, specifications for a deployment from the current cloud-based code environment to the updated cloud-based code environment.

8. The non-transitory computer-readable storage medium of claim 7, wherein the method further comprises:
automatically generating, by the analytics server, rules that implement the specifications for the deployment; and
sending, by the analytics server, the rules to the steering server.

9. The non-transitory computer-readable storage medium of claim 1, wherein the service requests are from end user devices and pertain to a plurality of remotely hosted applications including the remotely hosted application.

10. A computer-implemented method for transition between a current cloud-based code environment and an updated cloud-based code environment, the method comprising:
generating, by an analytics server, a steering policy, the steering policy comprising a set of rules to guide steering decisions between a current cloud-based code environment and an updated cloud-based code environment, wherein the current cloud-based code environment implements a current version of a remotely hosted application and the updated cloud-based code environment implements an updated version of the remotely hosted application, wherein the steering policy comprises:
a percentage of service requests to send to the current cloud-based code environment and a percentage of the service requests to send to the updated cloud-based code environment;
a type of device to send to the current cloud-based code environment and a type of device to send to the updated cloud-based code environment; and
a characteristic of a user of an end user device to forward a service request to a current end user device code environment and a second characteristic of a user of an end user device to forward a second service request to an updated end user device code environment;
sending, by the analytics server, the steering policy to a steering server, the steering server making steering decisions to steer, based on the steering policy, service requests between the current cloud-based code environment and the updated cloud-based code environment, wherein the steering decisions made by the steering server include:
selecting a ratio of splitting the service requests between the current cloud-based code environment and the updated cloud-based code environment; and
selecting types of the service requests to be steered to the updated cloud-based code environment;
receiving, by the analytics server, feedback concerning actual steering decisions made by the steering server, the feedback including at least an application delay time experienced by one or more end user devices when the updated cloud-based code environment processes the service requests associated with the one or more end user devices, the application delay time being determined based on metrics reported by the one or more end user devices to the steering server, wherein the metrics include dynamic computing resources associated with the one or more end user devices and a profile of the one or more end user devices, the profile storing configuration information associated with the one or more end user devices; and
automatically adjusting, by the analytics server, the steering policy in response to the feedback to provide an updated steering policy;
wherein the steering server makes the steering decisions with regard to the service requests associated with one or more current network sessions based on the steering policy;
wherein the steering server makes the steering decisions with regard to the service requests associated with one or more subsequent network sessions based on the updated steering policy; and
wherein the steering policy includes one or more of the following: dropping application deployments of a traffic, mirroring the application deployments of the traffic, redirecting the application deployments of the traffic, splitting the application deployments of the traffic, and rate limiting between replicated the application deployments of the traffic.

11. The method of claim 10, further comprising receiving user input of preferences as a basis for the set of rules.

12. The method of claim 10, wherein the automatically adjusting the steering policy further comprises one or more of the following: automatically adjusting the steering policy in response to input from a network administrator, increasing the percentage of service requests to be sent to the updated cloud-based code environment based on the feedback, and reducing a percentage of service requests to be sent to the updated cloud-based code environment based on the feedback.

13. The method of claim 10, further comprising:
receiving specifications for a deployment from the current cloud-based code environment to the updated cloud-based code environment.

14. The method of claim 13, further comprising:
automatically generating rules that implement the specifications for the deployment; and
sending the rules to the steering server.

15. The method of claim 1, wherein the service requests are from end user devices and pertain to a plurality of remotely hosted applications including the remotely hosted application.

16. A system for transition between a current cloud-based code environment and an updated cloud-based code environment, the system comprising:
an analytics server comprising a first hardware processor and a first memory, the analytics server being configured to:
generate a steering policy, the steering policy comprising a set of rules to guide steering decisions between a current cloud-based code environment and an updated cloud-based code environment, wherein the current cloud-based code environment implements a current version of a remotely hosted application and the updated cloud-based code environment implements an updated version of the remotely hosted application, wherein the steering policy comprises:
a percentage of service requests to send to the current cloud-based code environment and a percentage of the service requests to send to the updated cloud-based code environment;
a type of device to send to the current cloud-based code environment and a type of device to send to the updated cloud-based code environment; and
a characteristic of a user of an end user device to forward a service request to a current end user device code environment and a second characteristic of a user of an end user device to forward a second service request to an updated end user device code environment;
send the steering policy to a steering server;
receive feedback concerning actual steering decisions made by the steering server, the feedback including at least an application delay time experienced by one or more end user devices when the updated cloud-based code environment processes the service requests associated with the one or more end user devices, the application delay time being determined based on metrics reported by the one or more end user devices to the steering server, wherein the metrics include dynamic computing resources associated with the one or more end user devices and a profile of the one or more end user devices, the profile storing configuration information associated with the one or more end user devices; and
automatically adjust the steering policy in response to the feedback to provide an updated steering policy; and
the steering server comprising a second hardware processor and a second memory, the steering server being configured to make steering decisions to steer, based on the steering policy, service requests between the current cloud-based code environment and the updated cloud-based code environment, wherein the steering decisions made by the steering server include:
selecting a ratio of splitting the service requests between the current cloud-based code environment and the updated cloud-based code environment; and
selecting types of the service requests to be steered to the updated cloud-based code environment;
wherein the steering server makes the steering decisions with regard to the service requests associated with one or more current network sessions based on the steering policy;
wherein the steering server makes the steering decisions with regard to the service requests associated with one or more subsequent network sessions based on the updated steering policy; and
wherein the steering policy includes one or more of the following: dropping application deployments of a traffic, mirroring the application deployments of the traffic, redirecting the application deployments of the traffic, splitting the application deployments of the traffic, and rate limiting between replicated the application deployments of the traffic.

* * * * *